Feb. 10, 1925.
A. MELCHIOR
SPRING DAMPER FOR VEHICLES
Filed Oct. 20, 1923
1,526,169
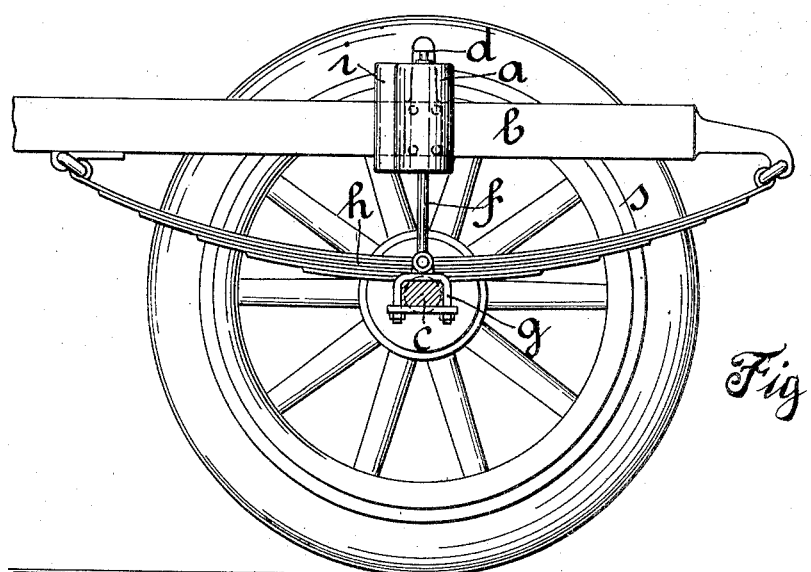
Fig. 1.
Fig. 2
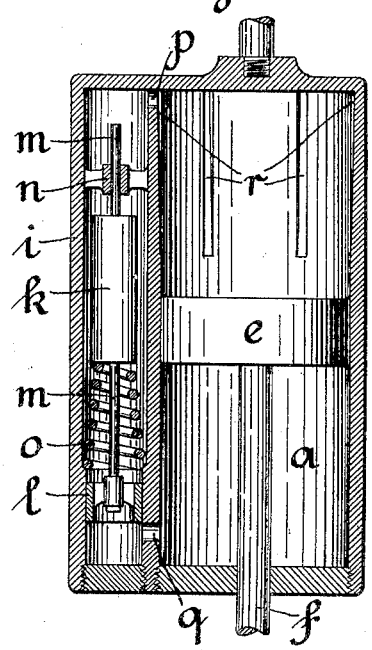
Inventor:
Alexander Melchior Patented Feb. 10, 1925.

1,526,169

UNITED STATES PATENT OFFICE.

ALEXANDER MELCHIOR, OF KARLSRUHE, GERMANY.

SPRING DAMPER FOR VEHICLES.

Application filed October 20, 1923. Serial No. 669,877.

*To all whom it may concern:*

Be it known that I, ALEXANDER MELCHIOR, a German citizen, residing at Karlsruhe, Germany, have invented a certain new and useful Improvement in Spring Dampers for Vehicles (for which I have filed an application for patent in Germany, February 11th, 1922), of which the following is a specification.

My invention refers to spring dampers or shock absorbers for vehicles, more especially for motor-driven vehicles, that is to say, devices adapted to prevent the shocks absorbed by the springs of the vehicle being passed on in an upward direction in an immoderately unpleasant degree. Most of the heretofore known spring dampers moderate or damp the movement of the springs in both directions and do not differentiate between a movement of the wheel downwards and a movement of the body of the vehicle upwards. By such means the desired effect may certainly be attained as far as the occupants of the vehicle are concerned, but the elastic effect of the vehicle as a whole is deteriorated. It is a most important function of the spring, when passing over a hole or recess in the ground, to quickly press the wheel downwards into said recess, so that the spring can then receive the downward fall of the body-mass of the vehicle. If, however, the damper operates in the manner described above, it will not be possible for the wheel to return rapidly enough to its normal distance from the body of the vehicle, so that the wheel and the vehicle body fall, so to say, as one compact piece into the hole or recess.

In order to eliminate this disadvantage, my invention provides a movable mass attached to the frame of the vehicle or to a wheel axle, and utilizes the movement of said mass relative to the frame or axle, resulting from its inertia, to influence the degree of the damping effect, or in other words, to regulate the action of the damper device.

The accompanying drawing illustrates one form of execution of the device according to my invention, Fig. 1 being a side view showing the mode of attachment of the damper to the vehicle, and Fig. 2 being a longitudinal section showing the damper in greater detail.

The damper itself consists of a glycerine or oil brake of known construction, of which the cylinder $a$ is carried by an arm $d$ attached to the vehicle frame $b$ or to the wheel axle $c$ (Fig. 1); the piston $e$ (Fig. 2) of the cylinder is connected with a stirrup $g$ (Fig. 1) on the axle $c$ by the rod $f$, so that the compression or expansion of the spring $h$ will cause the piston $e$ to move up or down within the cylinder $a$. To the cylinder $a$ is laterally attached a second cylinder $i$ of smaller diameter, in which the above mentioned mass can freely move up and down, said mass consisting of the plunger $k$ (Fig. 2) and an annular valve $l$ integral with the plunger. This mass is mounted on a rod $m$ guided in a sleeve $n$ and supported by a spring $o$ resting on the seat of the valve. Both cylinders $a$ and $i$ connect with each other at top and bottom through the apertures $p$ and $q$. The upper part of the cylinder $a$ is further provided with longitudinal grooves $r$, the depth of which gradually decreases towards the lower end.

The manner of operation of this device is as follows:

If the spring $h$ is compressed by the wheel $s$ running over an elevation in its path, the piston $e$ moves upwards in the cylinder $a$, at the same time causing the liquid in the cylinder to circulate freely through the apertures $p$ and $q$ (and, if necessary, through suitable non-return valves in the piston). After the shock the spring $h$ again assumes its former shape; two phases of action can now ensue: If the wheel $s$ moves onwards on a level surface immediately after the shock, the spring $h$ in expanding will push the frame $b$ together with the cylinders $a$ and $i$ upwards, whilst the mass $k$—$l$ in the beginning remains behind, on account of its inertia; this movement of the mass $k$—$l$ relative to the cylinders $a$ and $i$ results in the aperture $q$ being throttled by the valve $l$, thus impeding or braking the movement of the piston $e$. In order that the latter may not be too strongly braked when the spring is strongly compressed, on account of the high initial velocity of $b$, $a$ and $i$, the grooves $r$ are provided, which serve to increase the free circulation passage in the highest position of the piston. If, on the other hand, a recess in the path follows immediately after the elevation causing the shock, the spring $h$ presses the wheel $s$ downwards, whilst the frame $b$ with the cylinders $a$ and $i$ and the mass $k$—$l$ remain at rest; a movement of the mass relative to the cylinders will in this case not ensue; the aperture $q$ will therefore not be throttled and the movement of the piston $e$ will not be braked.

What I claim as my invention and desire to secure by Letters Patent is:

In spring dampers for vehicles in combination, a damping element inserted between a wheel axle and the spring supported frame of the vehicle, said damping element consisting of a cylinder containing a liquid and attached to the vehicle frame and a piston movable in said cylinder and connected to the wheel axle, a second cylinder attached to said damping cylinder, a mass freely movable up and down in said second cylinder an annular valve integral with said mass, a spring supporting said mass, and apertures provided in the wall of said damping cylinder and connecting the same with said second cylinder at top and bottom, said valve and that or those of said apertures which connect the cylinders at bottom or that which connects at top being disposed so that in the movement of said mass relative to said cylinders, resulting from the inertia of the mass in a movement of the axle and the frame relative to each other, this aperture or these apertures will be throttled by said valve.

In testimony whereof I affix my signature.

ALEXANDER MELCHIOR.

Witnessed by:
HOWARD TAYLOR.